(12) United States Patent
Dietrich

(10) Patent No.: US 12,545,465 B2
(45) Date of Patent: Feb. 10, 2026

(54) INSPECTION SYSTEM FOR A BLISTER MACHINE

(71) Applicant: Alltec Angewandte Laserlicht Technologie GmbH, Selmsdorf (DE)

(72) Inventor: Stephan Dietrich, Alsbach-Hähnlein (DE)

(73) Assignee: Alltec Angewandte Laserlicht Technologie GmbH, Selmsdorf (DE)

( * ) Notice: Subject to any disclaimer, the term of this patent is extended or adjusted under 35 U.S.C. 154(b) by 0 days.

(21) Appl. No.: 18/711,965

(22) PCT Filed: Dec. 20, 2022

(86) PCT No.: PCT/EP2022/086958
§ 371 (c)(1),
(2) Date: May 21, 2024

(87) PCT Pub. No.: WO2023/118119
PCT Pub. Date: Jun. 29, 2023

(65) Prior Publication Data
US 2025/0019109 A1 Jan. 16, 2025

(30) Foreign Application Priority Data
Dec. 22, 2021 (GB) ..................... 2118737

(51) Int. Cl.
*B65B 57/10* (2006.01)
*B65B 9/04* (2006.01)
(Continued)

(52) U.S. Cl.
CPC .............. *B65B 57/10* (2013.01); *B65B 9/045* (2013.01); *G06T 7/001* (2013.01); *G06T 7/90* (2017.01);
(Continued)

(58) Field of Classification Search
None
See application file for complete search history.

(56) References Cited

U.S. PATENT DOCUMENTS 8,373,081 B2 * 2/2013 Ackley .................. B07C 5/362
209/580
2012/0201434 A1 8/2012 Natali et al.
(Continued)

FOREIGN PATENT DOCUMENTS

EP 1726524 11/2008
EP 3553504 10/2019
(Continued)

OTHER PUBLICATIONS

"GB Search Report for Application No. GB2118737.2", Jun. 22, 2022, 1 page.
(Continued)

*Primary Examiner* — Tanzim Imam
(74) *Attorney, Agent, or Firm* — DeLizio, Peacock, Lewin & Guerra LLP

(57) ABSTRACT

There is provided a method for configuring an inspection system of a blister machine for producing blister packs comprising pharmaceutical products, the method comprising, obtaining, by the inspection system, an electronic reference comprising first data associated with a blister pack, analysing, by the inspection system, the electronic reference to extract the first data, obtaining, by the inspection system, a reference image comprising an image of a portion of an unsealed bottom film of the blister pack comprising one or more pockets in which pharmaceutical product is located, comparing, by the inspection system, the first data with the reference image, determining, by the inspection system and based on the comparing, second data associated with the pharmaceutical product, and generating, by the inspection system, reference data comprising the first data and the
(Continued)

second data, the reference data for use by the inspection system to identify issues during operation of the blister machine.

20 Claims, 9 Drawing Sheets

(51) Int. Cl.
    *G06T 7/00*     (2017.01)
    *G06T 7/90*     (2017.01)

(52) U.S. Cl.
    CPC ............... *G06T 2207/10024* (2013.01); *G06T 2207/30108* (2013.01)

(56) References Cited

U.S. PATENT DOCUMENTS

| | | | |
|---|---|---|---|
| 2016/0304229 A1 | 10/2016 | Hellenbrand | |
| 2020/0031511 A1* | 1/2020 | Taguchi | ............... G01N 21/359 |
| 2021/0047066 A1* | 2/2021 | Taguchi | ................... B65B 57/10 |
| 2022/0234776 A1* | 7/2022 | Ohura | ..................... B65B 9/045 |
| 2023/0043100 A1* | 2/2023 | Davis | ................... B65D 75/327 |

FOREIGN PATENT DOCUMENTS

| | | | | |
|---|---|---|---|---|
| JP | 2006189354 | | 7/2006 | |
| JP | 2006189354 A | * | 7/2006 | |
| JP | 2014213871 | | 11/2014 | |
| JP | 2017001698 | | 1/2017 | |
| JP | 2021181948 A | * | 11/2021 | ............. B65B 9/045 |
| WO | WO-2020179281 A1 | * | 9/2020 | ................ B07C 5/34 |

OTHER PUBLICATIONS

"PCT Application Serial No. PCT/EP2022/086958, International Search Report and Written Opinion", Mar. 28, 2023, 6 pages.

* cited by examiner

INSPECTION SYSTEM FOR A BLISTER MACHINE

TECHNICAL FIELD OF INVENTION

The invention relates to blister machines for producing blister packs comprising pharmaceutical products, and in particular to methods, systems and apparatus for configuring an inspection system of the blister machine.

BACKGROUND

In the pharmaceutical industry, blister machines are used for the automated packaging of products such as tablets or capsules in blister packs. Blister packs are typically formed on a production line, where an unsealed bottom film is molded to form pockets into which products, such as tablets, are placed. The unsealed bottom film is then covered and sealed with a lidding film so as to seal the product in the pockets, forming a sealed blister web. Individual blister packs can then be separated off from the sealed blister web and packaged in appropriate cartons for distribution.

During the production process, an inspection system may monitor the production of the blister packs to determine if there are any issues. For example, if the pockets in the unsealed bottom film are not properly formed, or the wrong tablet has been placed in a pocket, the inspection system can detect that there is an issue with the production and appropriate action can be initiated.

Inspection systems require calibration in order to correctly identify issues. For example, an inspection system may be calibrated such that it "knows" what a correct unsealed bottom film, blister pack or product looks like. Such a process is typically referred to as a teach-in process. Previous teach-in processes involve a user manually entering all data relating to the blister pack and product into the inspection system. For example, a user may type in all of the relevant dimensions and tolerances of the product and blister pack using a keyboard. The inspection system may then use the manually entered data as a reference from which it may compare with data gathered during production. However, such manual methods of inputting data are prone to human error, which can lead to inspection systems not identifying issues during production.

Having robust inspection systems in place is crucial in the pharmaceutical industry, since if a patient is provided the wrong medicine, or medicine is missing, the consequences can be extremely serious. Additionally, robust inspection systems are required to minimise production down-time, as typically, the sooner an issue can be determined, the lower the impact on the production. Therefore, there remains a need to provide an improved inspection system and method for detecting issues in the production of blister packs.

SUMMARY

In a first aspect there is provided a method for configuring an inspection system of a blister machine for producing blister packs comprising pharmaceutical products, the method comprising, obtaining, by the inspection system, an electronic reference comprising first data, the first data associated with a blister pack, analysing, by the inspection system, the electronic reference to extract the first data, obtaining, by the inspection system, a reference image, the reference image comprising an image of a portion of an unsealed bottom film of the blister pack comprising one or more pockets in which pharmaceutical product is located, comparing, by the inspection system, the first data with the reference image, determining, by the inspection system and based on the comparing, second data associated with the pharmaceutical product, and generating, by the inspection system, reference data comprising the first data and the second data, the reference data for use by the inspection system to identify issues during operation of the blister machine.

Advantageously, the method provides an improved method for configuring an inspection system which can be used to determine issues with the production of blister packs. As the method has a reduced reliance on user input than prior systems, the method is less error prone and more robust. As such, issues can be detected promptly and corrective action taken before defective blister packs are packaged for onward travel. Additionally, the speed with which issues can be determined minimises production down-time when issues do occur.

The pharmaceutical product may be tablets, capsules, powder, or any other form of pharmaceutical product. The product may be medicine.

The electronic reference may be an electronic file representing a document relating to the blister pack (e.g. relates to the blister pack itself, or components of the blister pack, such as the bottom film used in the blister pack). For example, the electronic reference may be a PDF, Postscript, EPUB, HTML, DOC, or ODT file, which relates to the blister pack.

The reference data is data which can be used as a reference to compare against subsequent data obtained during production of blister packs. That is, the reference data may be considered to represent a correct state against which subsequent data can be compared to check that the subsequent data is correct or that there is an issue with the subsequent data, and hence an issue with production.

Generating the reference data may be to associate the first and second data with the reference data. That is, the reference data may be the first and second data.

The first data associated with the blister pack may comprise data associated with the blister pack and/or components of the blister pack, such as the unsealed bottom film (or the bottom film generally), pockets or pocket layout (e.g. the arrangement of the pockets in the bottom film).

The reference image of the unsealed bottom film of the blister pack is an image of the unsealed bottom film of the blister pack prior to the blister pack having been separated off from the unsealed bottom film, since the bottom film is unsealed.

The first data associated with the blister pack may comprise geometric data associated the blister pack. The geometric data may be associated with any one or more of the blister pack, the unsealed bottom film, the pockets and the pocket layout. For example, the geometric data may be in the form of dimensions associated with the blister pack, the unsealed bottom film, the pockets, and or the pocket layout. The geometric data may also comprise shape data, e.g. data relating to the shape of the blister pack, the unsealed bottom film, and/or the pockets. The geometric data may also specify the distances between adjacent pockets.

The second data may comprise colour data associated with the pharmaceutical product.

For example, the colour data may specify the colour of the pharmaceutical product. That is, the first data, which may be geometric data relating to the unsealed bottom film and the pockets may be compared with the reference image (which is an image of the unsealed bottom film having pockets in which pharmaceutical product is located) so as to determine the colour of the pharmaceutical product. The colour of the pharmaceutical product can then be used in the reference data to check if subsequent production of blister packs includes the correct product by checking the colour of the product matches the reference data. Colour data may be the colour of the pharmaceutical product. The colour may be represented in any suitable way. Colour may also be represented as grey scale, for example if a black and white camera is used.

The second data may comprise geometric data of the pharmaceutical product.

For example, the geometric data may be in the form of dimensions associated with the pharmaceutical product (e.g. length, width, etc.). The second data may comprise both geometric data of the pharmaceutical product and colour data of the pharmaceutical product.

Determining the second data associated with the pharmaceutical product may comprise determining, by the inspection system, a location in the reference image corresponding to the one or more pockets, determining, by the inspection system, one or more features in the reference image associated with the location corresponding to the one or more pockets, and determining, by the inspection system, the second data based on the determined one or more features.

That is, the inspection system may determine where in the reference image one or more pockets in the unsealed bottom film are located, and may then determine a feature of the one or more pockets, such as the colour (or dominant colour) associated with the pocket, and then may associate that feature (such as that colour) with the pharmaceutical product (e.g. the determined one or more features form part of the second data).

Determining the one or more features in the reference image associated with the location corresponding to the one or more pockets may comprise determining, by the inspection system, colour data associated with the location to determine colour data of the pharmaceutical product.

For example, the inspection system may associate the colour data associated with the location with the pharmaceutical product to determine colour data of the pharmaceutical product. The colour data of the pharmaceutical product may form part of the second data.

The method may further comprise determining, by the inspection system and based on the colour data of the pharmaceutical product, geometric data associated with the pharmaceutical product.

That is, the colour data of pharmaceutical product may be used to determine the geometric dimensions of the product. For example, knowing the colour of the product means that the extent of the product in the reference image can be determined (e.g. the area taken up by the product in the reference image can be determined). A predetermined relationship between pixels and millimetres (or any other unit of length) may then be used to determine geometric dimensions of the actual product. Additionally, the shape of the product may be determined, based on the reference image.

The geometric data of the pharmaceutical product may form part of the second data.

The method may further comprise determining, by the inspection system, one or more features in the reference image associated with the unsealed bottom film in a region external to the one or more pockets.

That is, once the location of the one or more pockets have been identified, a region external to the pockets can be determined and features associated with the external region can be determined.

Determining one or more features associated with the unsealed bottom film may comprises determining, by the inspection system, colour data associated with the unsealed bottom film in the region external to the one or more pockets, associating, by the inspection system, the colour data associated with the region external to the one or more pockets with the unsealed bottom film.

That is, the colour of the unsealed bottom film may be determined once the pockets have been located. Given that the location of the pockets, and hence the pharmaceutical product has been determined (because the products are located in the pockets in the reference image), colour data associated with the pharmaceutical product can be excluded when trying to determine the colour of the unsealed bottom film. Once the colour data associated with the unsealed bottom film is determined, this may form part of the reference data.

Comparing the first data with the reference image may comprise generating, by the inspection system, a template based on the first data and comparing, by the inspection system, the template with the reference image.

For example, the template may be a digital representation of a portion of the unsealed bottom film. For example, the first data obtained from the electronic reference may describe all necessary information required to generate a digital representation of the unsealed bottom film which can then be compared with a portion of the unsealed bottom film in the reference image.

The template may require scaling prior to the comparison, e.g. such that the template is an appropriate size with respect to the unsealed bottom film in the reference image. The template may be scaled using suitable scaling parameters. The scaling parameters may be associated with the camera used to capture the reference image. The scaling parameters may be obtained through calibration, and/or may be provided by a manufacture, or from another source.

Comparing the template with the reference image may comprise matching, by the inspection system, the template to the portion of the unsealed bottom film in the reference image.

Any suitable template matching technique may be used. For example, the template may be aligned to the portion of the unsealed bottom film in the reference image such that the template overlaps the portion of the unsealed bottom film based on matching features, such as corners, pockets, etc.

The method may further comprise obtaining, by the inspection system, a second electronic reference comprising third data associated with the pharmaceutical product, analysing, by the inspection system, the second electronic reference to extract the third data, and comparing, by the inspection system, the third data to the second data to identify whether the second data is a match to the third data.

The second electronic reference may be obtained from a manufacturer of the product. The third data may specify geometric properties of the product.

For example, once the second data (data relating to the product) has been determined from the reference image, this data (or a portion thereof) can be compared with the third data from the second electronic reference to check if the second data matches the third data. If there is a match (within accepted predefined tolerance), there is a high probability that the second data is correct. If there is not a match, then this provides an indication that there may be an issue with the analysis of the second data. The configuration method may then need to be re-run.

Analysing the electronic reference may comprise extracting text data from the electronic reference.

Similarly, analysing the second electronic reference may comprise extracting text data from the second electronic reference.

The electronic reference may be a PDF file. Although, other file document types can be used, such as Postscript, EPUB, HTML, DOC, or ODT file types.

In a second aspect there is provided a method of operating a blister machine to produce blister packs containing pharmaceutical product, the method comprising configuring an inspection system as recited in the method of the first aspect, forming, by a pocket forming apparatus, pockets in an unsealed bottom film, inserting, by a product dispensing apparatus, a pharmaceutical product in each pocket obtaining, by the inspection system, an image of the unsealed bottom film, comparing, by the inspection system, the image to the reference data and determining, by the inspection system and based on the comparing, an issue with production of the blister packs.

For example, determining an issue may comprise determining that a pocket does not contain a product, that an incorrect product is located in a pocket (determined based on having an incorrect shape, dimensions and/or colour), that a pocket has not been correctly formed, that the pocket layout is incorrect, that the unsealed bottom film has incorrect dimension and/or colour.

The method may further comprise determining, by the inspection system, corrective action to be performed based on the issue and executing, by the inspection system, the corrective action.

The corrective action may be any one or more of output a notification to a user, output a control signal which causes a specific defective blister pack having the issue to be rejected, and/or output a control signal or which halts the blister machine. The action may be dependent on the issue. That is, a number of different actions may be defined for a number of different issues respectively.

In a third aspect there is provided a method for configuring an inspection system of a blister machine for producing blister packs comprising pharmaceutical products, the method comprising, obtaining, by the inspection system, an electronic reference comprising geometric data associated with an unsealed bottom film of a blister pack, analysing, by the inspection system, the electronic reference to extract the geometric data associated with the unsealed bottom film, obtaining, by the inspection system, a reference image, the reference image comprising an image of a portion of an unsealed bottom film of the blister pack comprising one or more pockets in which pharmaceutical product is located, comparing, by the inspection system, the geometric data associated with the unsealed bottom film with the portion of the unsealed bottom film in the reference image, locating, by the inspection system and based on the comparing, one or more pockets in the unsealed bottom film, determining, by the inspection system, colour data associated with the pharmaceutical product based on the location of the one or more pockets, determining, by the inspection system and based on the colour data associated with the pharmaceutical product, geometric data associated with the pharmaceutical product.

The method may further comprise generating, by the inspection system, reference data, the reference data comprising the geometric data associated with the unsealed bottom film and any one or more of the geometric data associated with the pharmaceutical product and colour data associated with the pharmaceutical product, wherein the reference data is for use by the inspection system to identify issues during operation of the blister machine.

In a fourth aspect there is provided an inspection system comprising one or more processors, a memory, the memory comprising computer readable instructions that, when executed by the processor, cause the processor to perform the method as recited in any of the first, second and third aspects described herein.

BRIEF DESCRIPTION OF DRAWINGS

Examples of various aspects of the disclosed subject matter will now be described with reference to the following Figures.

DETAILED DESCRIPTION

Figure 1:
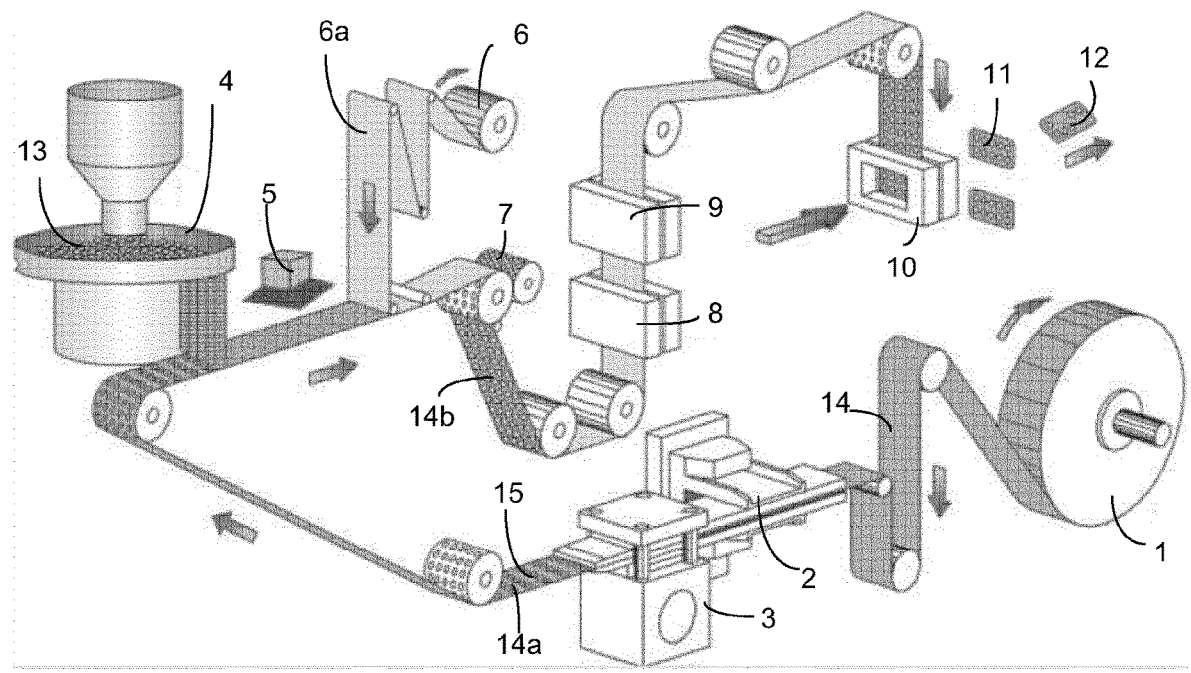
FIG. 1 shows a schematic representation of a blister machine for producing blister packs.

FIG. 1 shows a schematic representation of a blister machine for producing blister packs 11. The blister machine receives a bottom film 14 (sometimes referred to as an unsealed blister web or bottom foil) which is a continuous film that can be unwound from a forming film reel 1. The forming film reel 1 comprises a continuous film of material such as PVC, PVDC, Alu/Alu, Aclar, PP, etc. During operation of the blister machine, the bottom film 14 is unwound off the forming film reel 1 and pockets 15 are formed in the bottom film 14, the pockets 15 being arranged to accommodate a pharmaceutical product, such as a medicament, such as a tablet, capsule, powder, etc. Pockets 15 are formed using, for example, cold forming or thermoforming as will be well known in the art. For example, when thermoforming pockets, a heating apparatus 2 is used for heating the bottom film 14 so as to make the bottom film 14 malleable and a pocket forming apparatus 3 forms pockets 15 into the bottom film 14. The pockets 15 may be formed by pressing a mold comprising pocket shaped protrusions against the heated bottom film 14 such that pockets 15 are formed in the bottom film 14. At this stage in production, the bottom film 14 may be referred to as an unsealed bottom film 14a, in that the bottom film 14 contains pockets 15, but the pockets 15 have not yet been sealed.

The pockets 15 of the unsealed bottom film 14a are then filed with pharmaceutical product 13, such as tablets in the example shown. The product 13 can be dispensed in any suitable way. For example, in FIG. 1 tablets 13 are dispensed from a product dispensing apparatus 4 (which may be an auto feeding system) such that one tablet 13 is located in each pocket 15. Of course, depending on the product 13 being dispensed, the number of products 13 allocated to a pocket 15 may vary. Additionally, if the product 13 is a powder, then a predefined measure (such as by weight) of product 13 will be added to each pocket 15.

The pockets 15 are then sealed using a suitable sealing system. In the example shown, a lidding film reel 6 is provided comprising a lidding film 6a (sometimes referred to as a cover foil). The lidding film 6a comprises a continuous film made of a suitable material, such as a metal foil, which can be placed onto the unsealed bottom film 14a such that the pockets 15 are covered by the lidding film 6a. The lidding film 6a is then affixed in place using a suitable arrangement, such as a rotary sealing apparatus 7. The rotary sealing apparatus 7 uses heat and pressure to affix the lidding film 6a to the bottom film 14. The bottom film 14 being sealed with the lidding film 6a is typically referred to as a sealed blister web 14b (or blister strand) as the pockets 15, and hence the product 13, are sealed from the external environment.

Optionally, a coding apparatus 8 may be used to mark the sealed blister web 14b. For example, the coding apparatus 8 may emboss or otherwise mark an expiry date and/or batch number (corresponding to each blister pack 11 to be created from the sealed blister web 14b) on an edge of the sealed blister web 14b.

Optionally, the sealed blister web 14b is then perforated by a perforating apparatus 9, which adds perforated lines to the sealed blister web 14b making it easier to separate portions off from the sealed blister web 14b (e.g. sections of the sealed blister web are perforated such that portions can be separated off from the sealed blister web 14b). Individual blister packs 11 are then separated from the sealed blister web 14b by a separating apparatus 10, sometimes referred to as a trimming apparatus or punching apparatus. The separating apparatus cuts, punches, or otherwise physically separates the sealed blister web 14b into individual blister packs 11. The blister packs 11 can then be boxed and distributed, or sent elsewhere for further processing. For example, the blister packs 11 can be sent to a cartoner apparatus for being placed into cartons. Any defective blister packs 12 that are incorrectly filled or have any issues can be rejected by a suitable rejecting apparatus. For example, defective blister packs 12 can be automatically moved to a rejection bin (not shown) for disposal or recycling.

Between filing the pockets 15 of the unsealed bottom film 14a with product 13 and sealing the bottom film 14a with the lidding film 6a, an inspection system 5 is arranged to inspect the unsealed bottom film 14a and determine if there are any issues with production. The inspection system 5 comprises an electromagnetic sensor, such as a camera, which captures one or more images of the unsealed bottom film 14a. The one or more images are compared with reference data to determine if there are any issues. For example, the inspection system 5 may check the one or more images to determine if there are any issues with the unsealed bottom film 14a, such as checking if the unsealed bottom film 14a been formed correctly, has the correct number of pockets 15 per blister pack 11, has the correct dimensions, etc. The inspection system 5 may also check the one or more images to determine if there are any issues with the product 13, such as checking if any pockets 15 are missing a product 13, if there is a product 13 located outside of a pocket 15, if the correct product 13 is present, etc. If the inspection system 5 determines an issue, a suitable action may be determined by the inspection system 5 and put into effect. For example, the inspection system 5 may carry out any one or more of outputting a warning to a user (either visual or audio), outputting a rejection signal to a rejecting apparatus (not shown) which instructs the rejecting apparatus to remove an identified defective blister pack 12 having an issue, and outputting a control signal to halt production of the blister packs 11.

Figure 2:
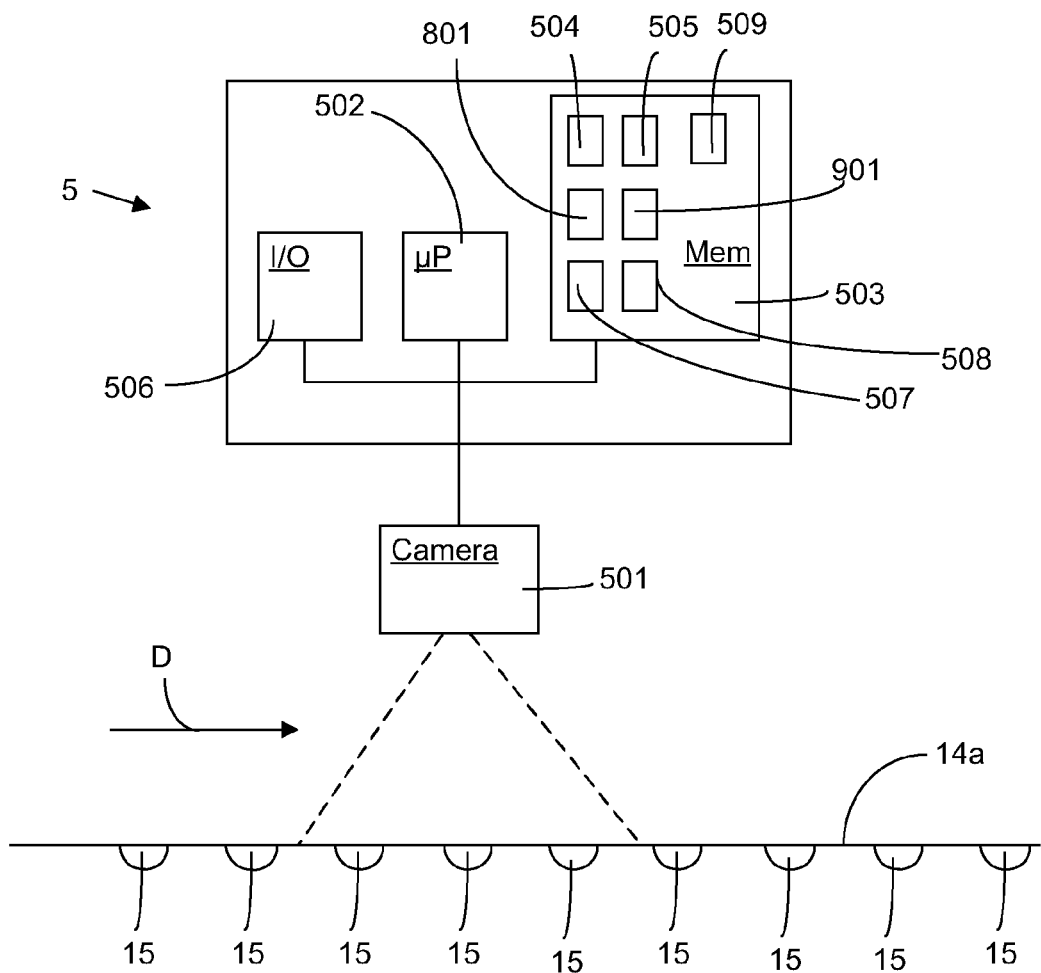
FIG. 2 shows a schematic representation of an inspection system.

A simplified schematic representation of the inspection system 5 is shown in FIG. 2, which also shows the unsealed bottom film 14a in side view. The inspection system 5 comprises a camera 501 for capturing an image of a portion of the unsealed bottom film 14a and pockets 15 in which product has (or should have been) inserted (note that product 13 is not shown in the pockets 15 of FIG. 2 for clarity). That is, the camera 501 is arranged to capture images of the unsealed bottom film 14a at a stage between filling the pockets 15 with product 13 and sealing the unsealed bottom film 14a with the lidding film 6a. Dotted lines extending from the camera give an example of the camera's view. The unsealed bottom film 14a passes by the camera 501 moving in direction D along the production line. Note that only one camera 501 is shown for clarity, but it will be appreciated that any number of cameras may be used. The camera 501 is arranged to capture a top view of the unsealed bottom film 14a (e.g. looking into the pockets 15 such that the product 13 is also captured in the image). Of course, other arrangements are possible. For example, where the unsealed bottom film is transparent, the camera 501 may be placed to capture a bottom view of the unsealed bottom film 14a (e.g. looking into the pockets 15 through the unsealed bottom film 14a such that the product 13 is also captured in the image).

The inspection system 5 comprises a processor 502. The processor 502 may be any suitable computer processor, such as a CPU and/or GPU, and may comprise multiple processors. The processor 502 is configured to, amongst other things, process images taken by the camera 501 and to determine an issue based on the image. The inspection system 5 comprises a memory 503. The memory 503 may be any suitable computer memory for storing computer readable files. For example, the memory 503 may be non-volatile memory, such as an HDD, or non-volatile memory, such as RAM, or a combination. The memory 503 may be used to store reference data 504. The reference data 504 is data which can be used as a reference to compare against subsequent data obtained during production so as to identify issues in production. The memory 503 may also store images 505 taken with camera 501 which are to be processed by the processor 502. The memory 503 may also store a first electronic reference 801 associated with the blister pack 11, and second electronic reference 901 associated with the product 13, which is described later. The memory 503 may also store a reference image 507, described below. The memory may also store first data 508 and second data 509, described below. Other data not shown may of course be stored in the memory 503. The inspection system 5 also comprises an I/O interface 506 for external communication. The I/O interface 506 may comprises any suitable arrangement. For example, the I/O interface 506 may couple to a user interface for communication with a user, such as a monitor, keyboard, mouse, touch screen, speaker, microphone, etc. The I/O interface 506 may connect to other devices in the blister machine or external to the blister machine. For example, the I/O interface 506 may connect to the internet for communication with external computers. The I/O interface 506 may connect to a mobile phone, or tablet, using, for example, an app or web interface.

The camera 501 may be any suitable camera. For example, the camera may be a black and white, or colour camera. The camera 501 may be high resolution, e.g. have a resolution higher than 1 Megapixel. The camera 501 may have a Gigabit Ethernet or 'GigE' camera interface. During production of blister packs 11, the camera 501 may record images continuously, or may take images periodically. For example, advancement of the unsealed bottom film 14a may periodically stop, and when stationary, the camera 501 may capture an image of the unsealed bottom film 14a. The camera 501 may capture images corresponding to each blister pack 11 contained within the unsealed bottom film 14a. For example, if a specific blister pack 11 has three pockets in the direction of travel D, the camera 501 may capture an image of the unsealed bottom film 14a such that the three pockets of the specific blister pack 11 are captured in the image. The next image captured by the camera 501 may comprise the immediately adjacent next three pockets corresponding to an adjacent blister pack 11. The inspection system 5 may index the images such that a specific image can be associated with a specified blister pack 11. In this way, if an issue is determined with a specific portion of the unsealed bottom film 14a, the inspection system 5 can determine which blister pack 11 will have the issue (when separated from the sealed blister web 14b). This determination can be used to reject a specific defective blister pack 12. For example, a control signal may be sent from the inspection system 5 to a rejecting apparatus which instructs the rejecting apparatus to reject the specific defective blister pack 12. Alternatively or in addition, a shift register can be used to track information (such as whether a particular blister pack is to be rejected, or whether the particular blister pack is ok) which can be used by the rejecting apparatus.

Figure 3:
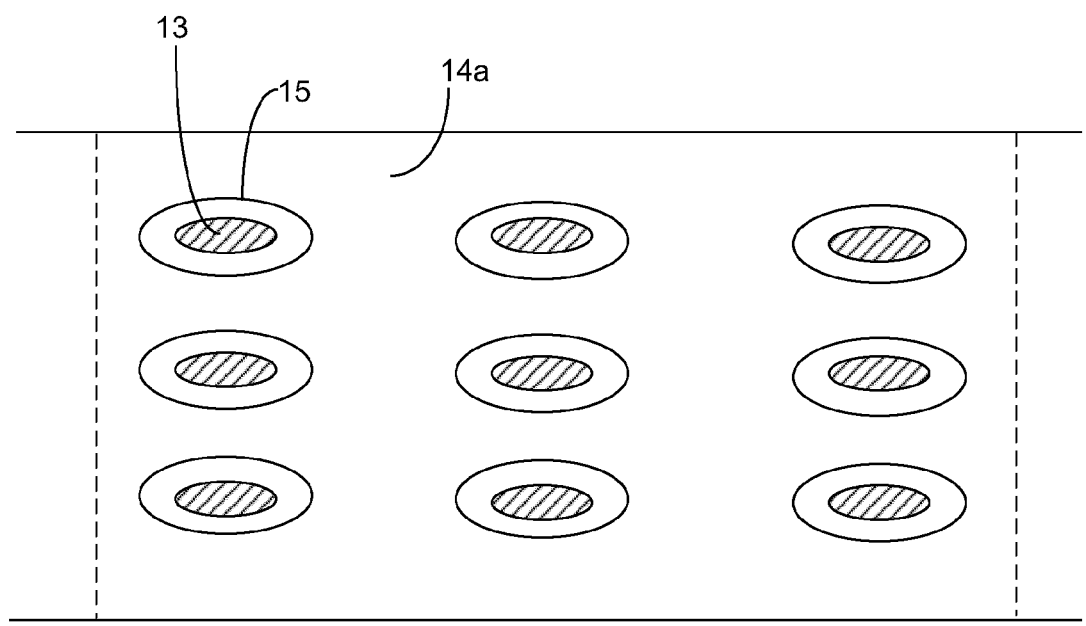
FIG. 3 shows a schematic representation of an unsealed bottom film which has been correctly filled.
Figure 4:
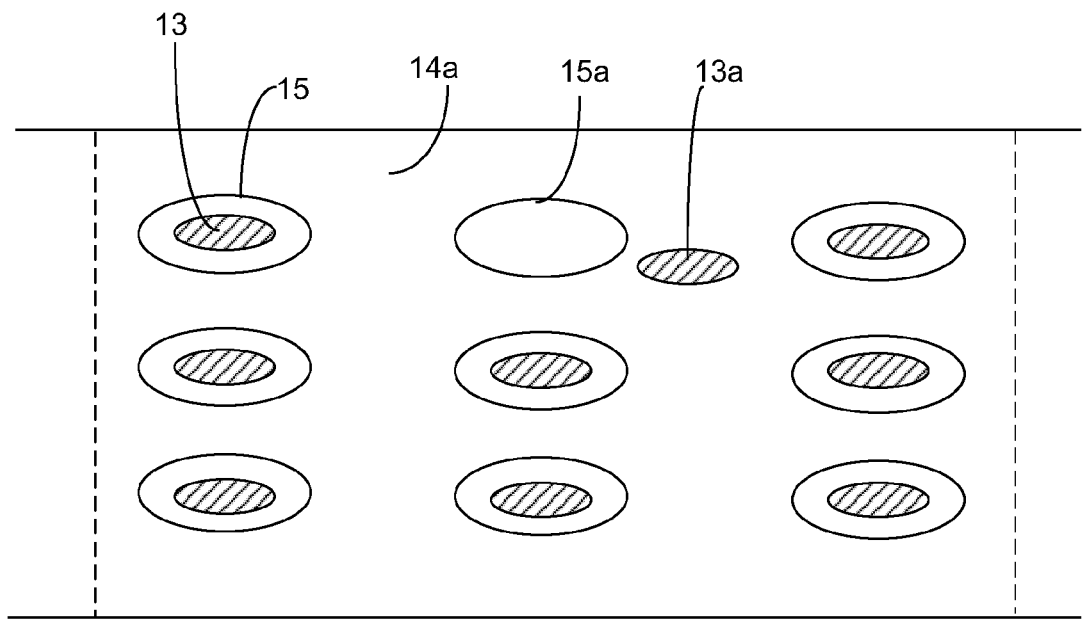
FIG. 4 shows a schematic representation of an unsealed bottom film which has been incorrectly filled.
Figure 5:
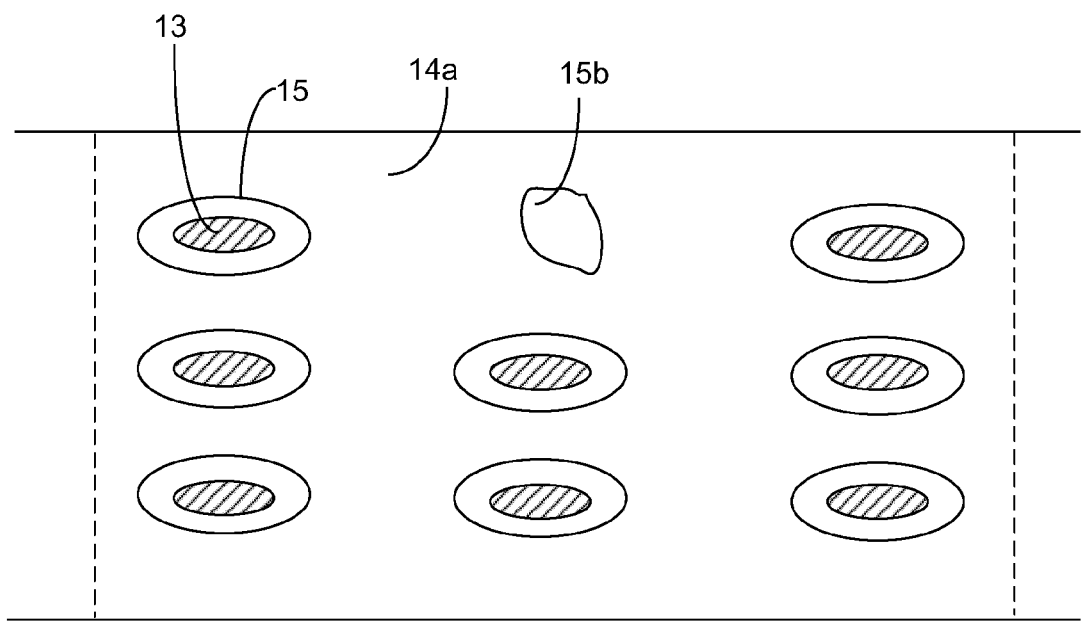
FIG. 5 shows another schematic representation of an unsealed bottom film which has a poorly formed pocket.
Figure 6:
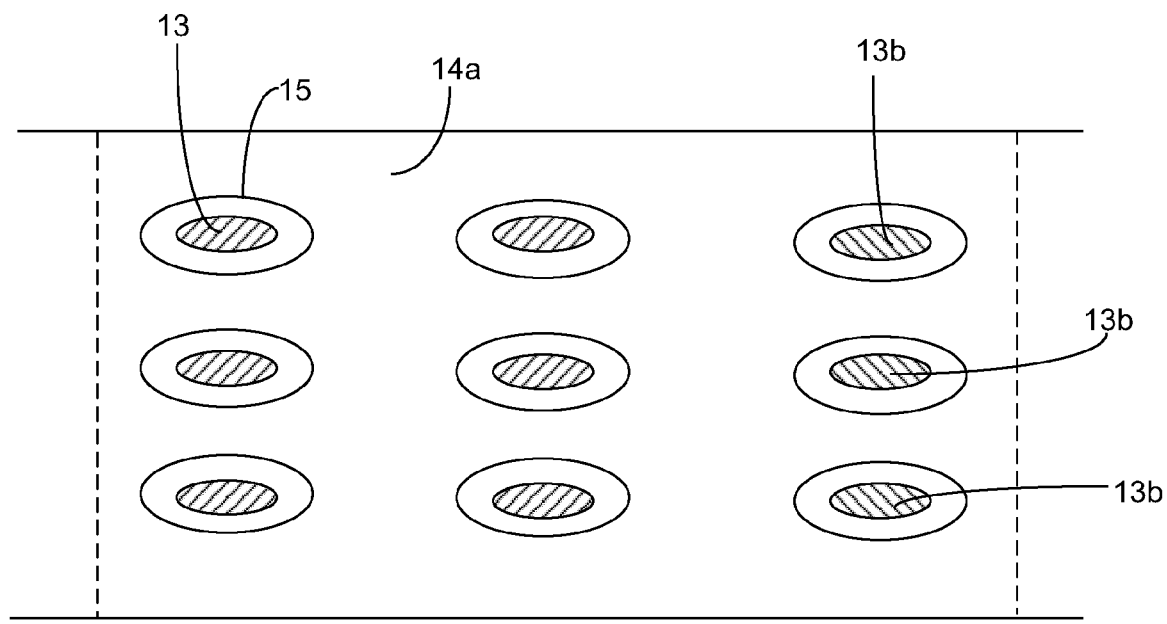
FIG. 6 shows another schematic representation of an unsealed bottom film which has been incorrectly filled with an incorrect product having a different colour to the colour of the correct product.
Figure 7:
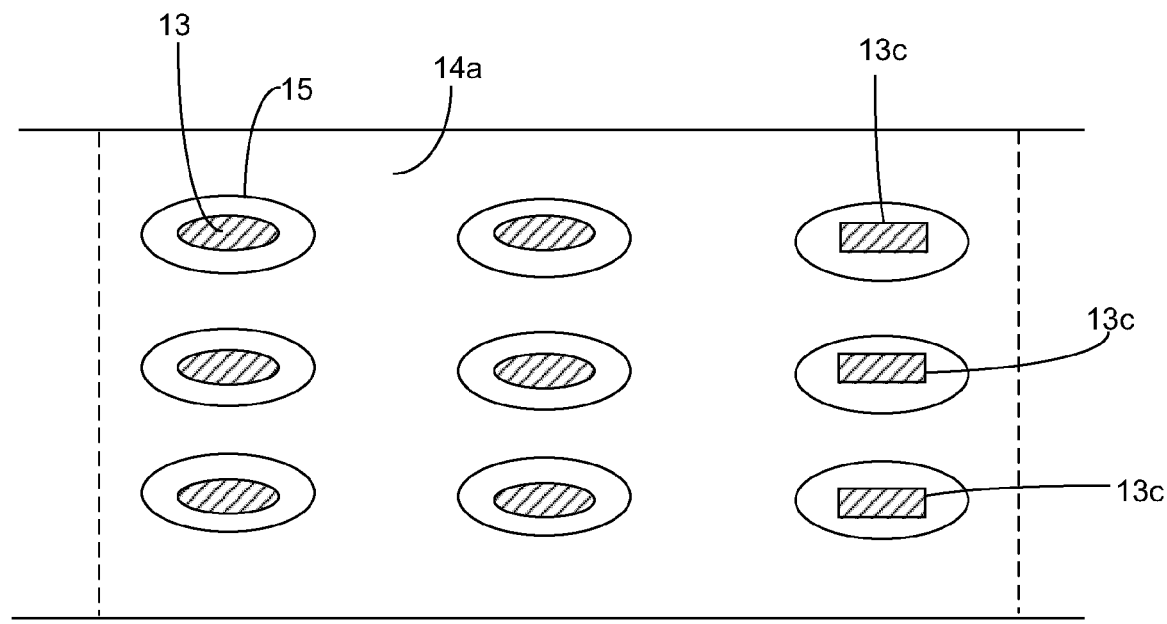
FIG. 7 shows another schematic representation of an unsealed bottom film which has been incorrectly filled with an incorrect product having a different shape to the shape of the correct product.

FIG. 3 shows a schematic view of a correctly filled unsealed bottom film 14a, as may be captured in an image by the camera 501 of the inspection system 5. The unsealed bottom film 14a has been correctly filed with each tablet 13 located in each pocket 15. Dotted lines in FIG. 3 schematically represent where the unsealed bottom film 14a will be cut in order to form the blister pack 11—that is, in this specific example the blister pack 11 when formed will have 9 tablets in a three by three arrangement. Other arrangements are of course possible. FIGS. 4, 5, 6 and 7 show schematic views of examples where there is an issue with the unsealed bottom film 14a, as may be captured in an image by the camera 501 of the inspection system 5. In FIG. 4, tablet 13a has not landed in pocket 15a, and is instead located external to pocket 15a and on the surface of the unsealed bottom film 14a. In FIG. 5, one of the pockets 15b has not been correctly formed and no tablet 13 is present in the incorrectly formed pocket 15b, because in this case it could not enter the incorrectly formed pocket 15b and has fallen off the bottom film 14a. In FIG. 6, three incorrect tablets 13b (having a different colour to the expected tablets 13) have been inserted into one of the rows of pockets of the unsealed bottom film 14a. Note that difference in colour of the tablets 13, 13b in FIG. 6 is illustrated by different hatched fill patterns. In FIG. 7, three incorrect tablets 13c (having a different shape to the expected tablets) have been inserted into one of the rows of pockets of the unsealed bottom film 14a. In any one of these scenarios, the inspection system 5 is able to analysis the image by comparing the image to the reference data 504, determine that that there is an issue, and take action, such as any one or more of output a notification to a user, output a control signal which causes a specific defective blister pack 12 having an issue to be rejected, and/or output a control signal or which halts the blister machine. The action may be dependent on the issue. That is, a number of different actions may be defined for a number of different issues respectively. For example, the inspection system 5 may stop the blister machine if a tablet 13a is located on top of the bottom film 14a (as illustrated in FIG. 4), otherwise the rotary sealing apparatus 7 could be damaged if the tablet 13a is not removed. Whereas, if it is determined that a product 13 is not present in one of the pockets 15, and is not located on the bottom film 14a, the inspection system 5 may simply reject that particular blister pack (i.e. the blister pack that will be formed which will include the empty pocket 15). Additionally, the inspection system 5 may record information for statistical analysis which can be provided to the user. That is, statistical information may be provided on a display, or printed out, and may be used for a variety of purposes, such as validation purposes.

A wide variety of different products can be packaged in a wide variety of different blister pack arrangements on a blister machine. This flexibility is achieved through the concept of product-specific format parts. Format parts are mechanical and electrical components of the blister machine that are not permanently integrated but can be exchanged with relatively little effort. For example, format parts may be used to define the size of the blister pack and the number, position and shape of the pockets. For example, when a blister machine is arranged to produce a new type of blister pack, the mechanical parts in the pocket forming apparatus 2 may be changed to form a new pocket layout, and/or to form pockets 15 having new dimensions. In another example, the product dispensing system 4 may be installed with new format parts to handle different types of product or to arrange the product in different pocket arrangements. In yet another example, the separating apparatus 10 may be installed with new format parts so as to separated blister packs 11 in a different way. New format parts can also be installed in any of the other apparatus, such as the rotary sealing apparatus 7, coding apparatus 8 or perforating apparatus 9 in a similar manner.

Figure 8:
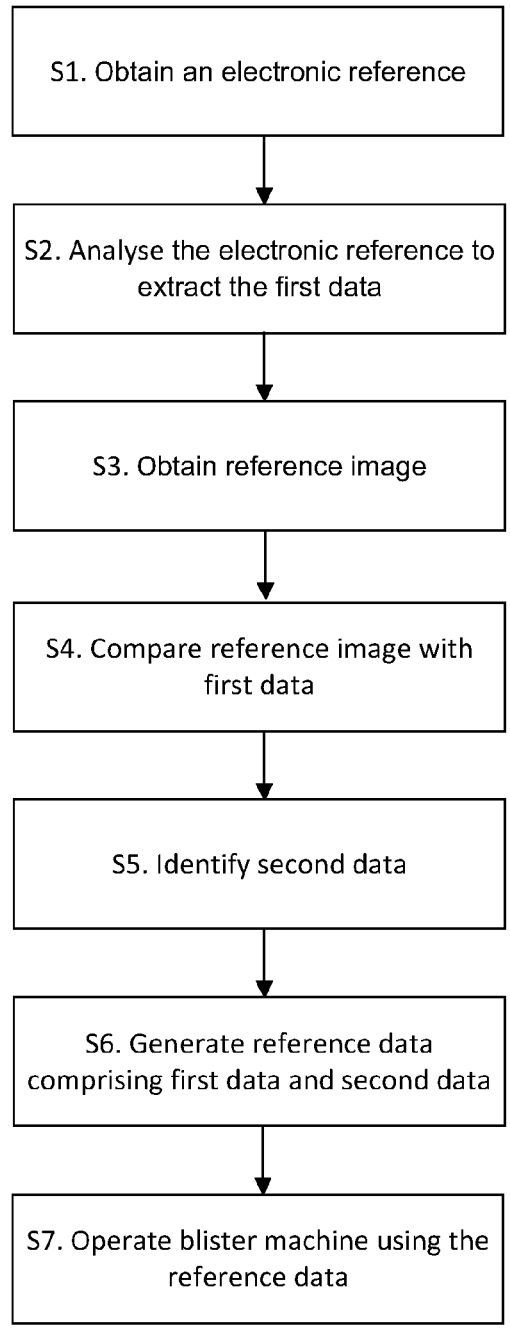
FIG. 8 shows a flow diagram of a method according to an aspect of the disclosed subject matter.

When a new type of blister pack 11 is to be produced, and/or a new type of product 13 is to be placed in the pockets 15 of the blister pack 11, the inspection system 5 will require updating. More particularly, the reference data 504 needs to be updated such that the inspection system 5 is able to determine if an image captured of the unsealed bottom film 14a highlights an issue in production. FIG. 8 shows a method for configuring an inspection system 5. In particular, the method leads to the generation of the reference data 504. The method may be performed after one or more format parts have been changed on the blister machine to produce a new blister pack 11. Steps S1 to S6 relate to a configuration method for configuring the inspection system 5. Step S7 relates to a method of operating a blister machine using the reference data 504 generated during the configuration method of Steps S1 to S6.

Figure 9:
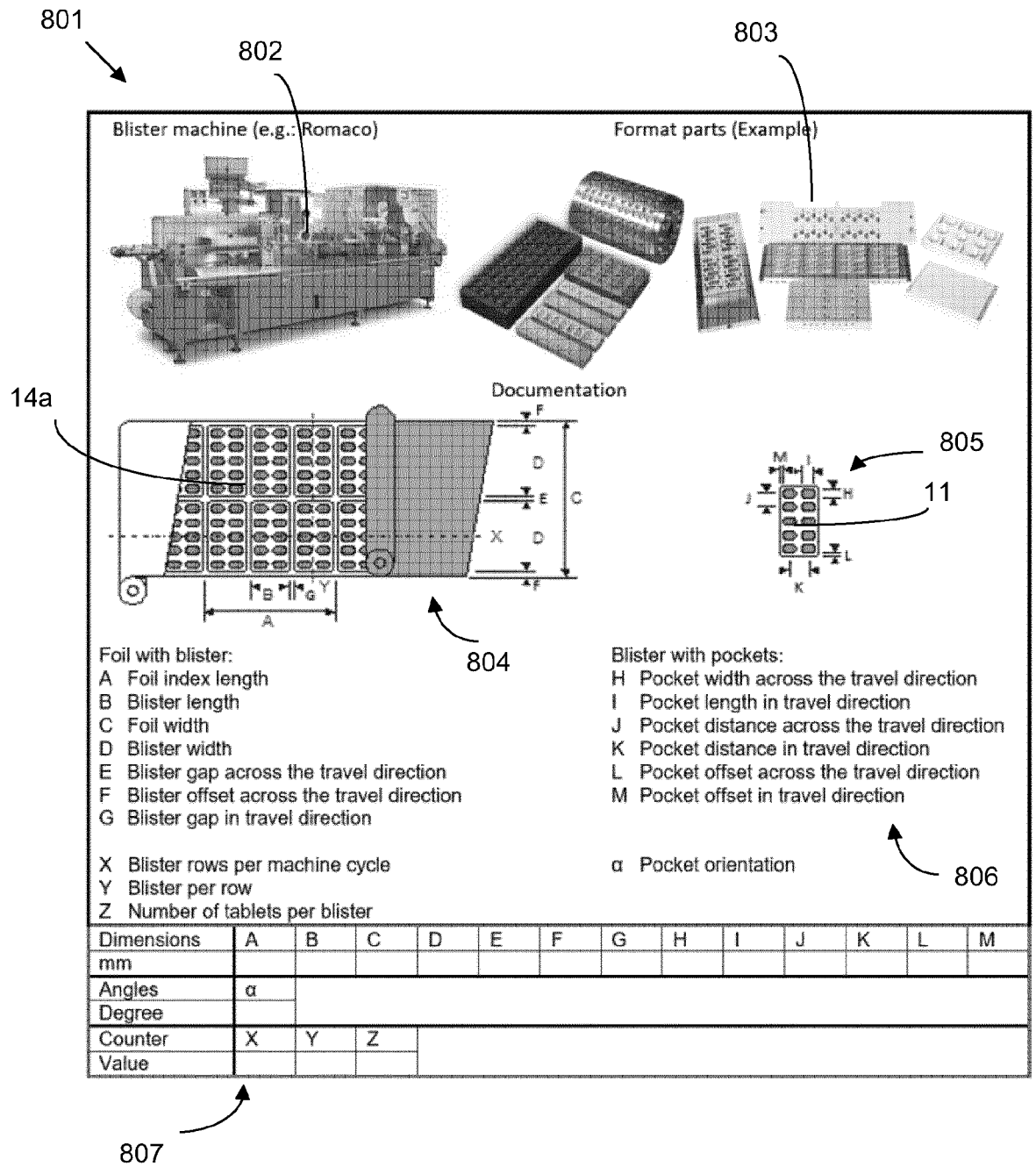
FIG. 9 shows a schematic representation of a first electronic reference associated with a blister pack.

At Step S1, an electronic reference 801 is obtained by the inspection system 5. The electronic reference 801 comprises first data 508, the first data 508 associated with the blister pack 11. A schematic representation of the electronic reference 801 is shown in FIG. 9, described in more detail below. In this example, the first data 508 comprises geometric data associated with the unsealed bottom film 14a (which forms a part of the blister pack 11), the blister pack 11, the pockets 15 formed in the blister pack 11, and the pocket layout 15. For example, the geometric data specifies geometric properties (such as shape and/or dimensions) of any one or more of the blister pack 11, the unsealed bottom film 14a, pockets 15 and pocket layout.

The electronic reference 801 may be obtained by the inspection system 5 from any suitable source. For example, the manufacturer of the format parts used to produce the blister packs 11 may provide the electronic reference (e.g. a corresponding electronic reference accompanying the format parts). The electronic reference 801 may be downloaded from a server (not shown) associated with the manufacturer of the format parts. The electronic reference 801 may instead be downloaded from a server associated with the user. That is, the user of the blister machine may upload a copy of the electronic reference 801 to their server, such that the electronic reference 801 may be made available to all of the user's blister machines. The electronic reference may be transmitted to the inspection system 5 using an intermediate device, such as a USB drive, or a mobile phone.

The electronic reference 801 may be in any suitable form. In one example, the electronic reference 801 is a PDF file. Although, other file document types can be used, such as Postscript, EPUB, HTML, DOC, or ODT file types. Typically, such electronic references are compiled for the benefit of a human reader. That is, manufacturers of format parts typically make accompanying electronic references available to users in order for the user to understand the new format parts.

In the example shown in FIG. 9, the electronic reference 801 comprises general information 802, 803 relating to, for example, the type of blister machine used to produce the blister pack and the format parts (note this general information 802, 803 is simply depicted as images of the blister machine and format parts, but it will be appreciated that more detailed images and text may also be present). This information may be general information for the user. In the example shown in FIG. 9, geometric data associated with the unsealed bottom film 14a and blister pack 11 is provided. Geometric data is set out in a table 807 (for clarity the actual values in the table have been left blank). That is, table 807 lists relevant geometric data relating to the unsealed bottom film 14a, blister pack 11, pockets 15, and pocket layout. The first data 508 mentioned above comprises the geometric data listed in table 807. The table 807 also lists data relating to the number of tablets per blister, which may also form part of the first data 508.

The electronic reference 801 comprises a legend 806 which provides a description of the various dimensions in the table 807. Furthermore, the electronic reference 801 comprises schematic FIGS. 804, 805 of the unsealed bottom film 14a and the blister pack 11. The schematic FIGS. 804, 805 provide a visual indication of some of the corresponding dimensions listed in the table 807 and legend 806. Note that entry "Z Number of tablets per blister" in legend 806 does not have a corresponding "Z" in schematic FIGS. 804, 805 in this example. Similarly, entry "a Pocket orientation" in legend 806 does not have a corresponding "a" in the schematic FIGS. 804, 805 in this example. It will be appreciated that not all values in the legend 806 may be required to be depicted in the schematic FIGS. 804, 805. While an example of the electronic reference 801 is shown having schematic FIGS. 804, 805, legend 806 and table 807, it will be appreciated that the data may be presented in other ways. That is, different manufacturers of format parts may present their electronic references in different ways.

The electronic reference 801 may contain any suitable data relating to the blister pack 11, such as data relating directly to the blister pack 11, or to portions/components of the blister pack 11, such as the unsealed bottom film 14a, pockets 15, pocket layout and/or lidding film 6a (note that data relating to the lidding film i6a is not shown in FIG. 9). In the example shown in FIG. 9, data relating to the blister packs 11 and bottom film 14a, listed in legend 806, include foil index length (which, for intermittent running blister machines, is typically the length that is subtracted within one machine cycle); blister length (e.g. the length of the blister pack 11); foil width (e.g. the width of the bottom film 14); blister width (e.g. the width of the blister pack 11); blister gap across the travel direction (e.g. the gap between blister packs 11 in the bottom film 14 across the travel direction); blister offset across the travel direction (e.g. the gap between the edge of the blister pack 11 and the edge of the bottom film 14 across the travel direction); blister gap in travel direction (e.g. the gap between blister packs 11 in the bottom film 14 in the travel direction); blister rows per machine cycle; blisters per row (e.g. how many blister packs 11 are arranged across the travel direction); and number of tablets per blister. Data relating to the pockets include pocket width across the travel direction, pocket length in the travel direction, pocket distance across the travel direction (e.g. the distance between the middle of adjacent pockets across the travel direction); pocket distance in the travel direction (e.g. the distance between the middle of adjacent pockets in the travel direction; pocket offset across the travel direction (e.g. gap between an outermost pocket and the edge of the blister pack 11); pocket offset in the travel direction (e.g. gap between an outermost pocket and the edge of the blister pocket in the travel direction); and pocket orientation (such as how the pocket is orientated with respect to the blister pack 11). While not shown, other data may be present, such as data relating to the slope of the walls of the pocket, radii of the blister corners, dimensions relating to print marks on the blister packs if applicable, and data relating to the lidding film.

At step S2, the electronic reference 801 is analysed by the inspection system 5 to extract the first data 508. For example, the electronic reference 801 may be parsed to extract the first data 508, where the processor 502 may use any suitable means in order to "read" the electronic reference 801 and extract the first data 508. Where the electronic reference 801 is a PDF document, the processor 502 may parse the electronic reference 801 using the open source command line utility "pdftotext", or any other PDF to text method, to obtain text in the document.

The presentation of the electronic reference 801 may be predetermined. That is, it may be known where in the electronic reference 801 the first data 508 is located such that the inspection system 5 is able to extract the first data 508. For example, it may be known by the inspection system that the first data 508 is arranged in the table 807. It may also be known where the table 807 is located in the electronic reference 801, and in what order the first data 508 is presented in the table 807. The extracted first data 508, such as numerical values relating to dimensions, can then be associated with its corresponding dimension. Alternatively, the inspection system 5 may read the electronic reference 801 and understand which portions of the electronic reference 801 relate to the first data 508. Such methods may involve the use of machine learning models that have been trained to read electronic references and associate values with their corresponding dimensions.

At Step S3, a reference image 507 is obtained by the inspection system 5. The reference image 507 comprises an image of the unsealed bottom film 14a of the blister pack 11 and one or more pockets 15 in which pharmaceutical product is located. For example, the reference image 507 is an image of a correctly formed, and correctly filed, portion of the unsealed bottom film 14a, prior to being sealed with the lidding film 6a. The reference image 507 is captured by the camera 501. For example, the blister machine may be operated for a short period of time sufficient to allow a portion of unsealed bottom film 14a which has been filled with tablets to reach camera 501, and the camera 501 may capture the reference image 507. A user may be present to check that the image taken by the camera 501 shows an unsealed bottom film 14 that has the correct tablets located in each pocket 15 and that the unsealed bottom film 14a is formed correctly. As such, the reference image 507 indicates a correctly formed and filled unsealed bottom film 14a. It will be appreciated that the reference image 507 may be obtained prior to steps S1 and S2, prior to step S2, or after Step S2.

At step S4, the first data 508 is compared with the reference image 507 by the inspection system 5. The first data 508 may be compared with the reference image 507 in a number of ways. In an example, a template may be generated by the processor 502 based on the first data 508, and the template may be compared with the reference image 507. The template is a digital representation of the unsealed bottom film 14a. For example, the first data 508 extracted from the electronic reference 801 provides information allowing the inspection system 5 to generate a digital representation of the unsealed bottom film 14a (e.g. a virtual representation of the unsealed bottom film 14a) in the form of a template. The template can then be compared with a portion of the unsealed bottom film 14a in the reference image 507.

In order to compare the template with the reference image 507, a scaling operation may need to be performed such that the relative dimensions of the template match the portion of the unsealed bottom film 14a in the reference image 507. For example, the template may be scaled based on scaling parameters associated with a camera 501 used to capture the reference image 507. The scaling parameters may be any suitable parameters required to scale the template appropriately. For example, where the first data 508 relates to geometric data, the geometric data in the electronic reference 801 may be expressed in units of millimetres and so the geometric data may be converted into units of pixels using appropriate scaling parameters. The scaling parameters may be based on any suitable data, such as intrinsic parameters of the camera 501 and extrinsic parameters, such as relative positions of the camera 501 and the unsealed bottom film 14a being imaged. The scaling parameters may be obtained through calibration, and/or may be provided by a manufacture of the camera 501, or from another source.

Once the scaled template is obtained, the scaled template can be compared with the reference image 507. For example, the scaled template can be compared with a portion of the unsealed bottom film 14a in the reference image 507. Comparing the template (or in this example the scaled template) to the reference image 507 may comprise performing a template matching process. That is, matching the template to a portion of the unsealed bottom film 14a by matching features of the template (such as edges of the unsealed bottom film 14a in the template) to corresponding features of the unsealed bottom film 14a in the reference image 507 (such as edges of the unsealed bottom film 14a in the reference image 507). Put another way, the template may be aligned with the portion of the unsealed bottom film 14a in the reference image 507 such that the template overlaps the unsealed bottom film 14a in the reference image 507.

At Step S5, second data 509 associated with the product 13 is determined by the inspection system 5, based on the comparing in Step S4. In many cases, the electronic reference 801 will not comprise data relating to the properties of the product 13, such as the tablets, that are to be inserted in the pockets 15. It is therefore advantageous if the inspection system 5 is able to derive information relating to the product 13 from the reference image 507. One way of achieving this is to determine which parts of the reference image 507 relate to the product 13 (e.g. which pixels in the reference image 507 correspond with the product 13). For example, once the scaled template has been matched to the unsealed bottom film 14a, the location of the pockets 15 in the reference image 507 may be determined based on the location of the pockets 15 in the scaled template. Once the location of the pockets 15 in the reference image 507 are determined, data relating to the product 13 may then be ascertained. For example, pixel data from an area defining the pockets 15 in the reference image 507 may be used to determine data relating to the products 13. There are a number of ways in which this may be achieved. For example, the template may be used as a mask to mask the unsealed bottom film 14a, but where the pockets 15 in the template have been "cut out" so as to not mask the product 13. That is, when the template overlaps the unsealed bottom film 14a in the reference image 507, only portions in the areas comprising the pockets 15 will be unmasked. The unmasked portions corresponding to the pockets 15 may then be used to determine the second data 509.

The second data 509 may comprise colour data associated with the product 13 (e.g. the colour of the product 13). For example, the colour of pixels associated with the area comprising the pockets 15 in the reference image 507 can be used to determine the colour of the product 13 (as seen by the camera 501). Typically, the pockets 15 will be a little larger than the product 13 contained within the pocket 15, and so there may be two distinct colours associated with the area comprising the pockets 15; the first colour relating to the product 13 and the second colour relating to the colour of the pocket 15. Differentiating between the colour of the product 13 and the pocket 15 may be achieved in any suitable way. For example, the colour forming the majority of the area comprising the pockets 15 in the image 507 may be taken as the colour of the product 13. Alternatively, colour associated with a centre of the pocket 15 may be taken as the colour of the product 13. Alternatively, because the colour relating to the product 13 may be surrounded by the second colour relating to the pocket 15 (because the product 13 is within the pocket 15), the colour relating to the product 13 may be identified as the first colour that is surrounded by the second colour.

Optionally, the colour (as seen by the camera) of the unsealed bottom film 14a may also be determined by associating the colour of the pixels in an area of the reference image 507 corresponding to the unsealed bottom film 14a which does not include the pockets 15. While some electronic references may comprise colour data relating to the blister pack 11, or components thereof, such as the bottom film 14a, colour captured by different cameras is not universal. As such, one camera may "see" a particular colour differently than another camera. For example, the white balance of the cameras, or the colour temperature of a lighting apparatus used to illuminate the unsealed bottom film 14a can affect appearance of any colour when captured by the camera. Therefore, even if colour information is available in the electronic reference 801, it is still advantageous to obtain a reference image 507 using the camera 501, and determine the colour (as seen by the camera 501) based on the reference image 507.

The second data 509 may comprise geometric data associated with the product (e.g. the dimensions and/or shape of the product). For example, once the colour of the product 13 has been determined, the extent of the product 13 in the reference image 507 can be readily determined—e.g. areas of the reference image 507 having the same colour as the determined colour of the product 13 can be assumed to be associated with the product 13.

The areas of the pixels in the reference image 507 which contain the product 13 can be used to determine, for example the length and width (e.g. converting between pixels and millimetres) of the product 13. Once the area of the pixels which containing the product 13 have been determined based on their colour, pixel data can be converted to millimetres using, for example, scaling parameters, to obtain the length and width in millimetres of the product 13. If a 3D camera, or 3D system employing multiple cameras, is used, then depth information of the product can be determined also. Data relating to the shape of the product 13 can also be determined from the reference image 507. That is, the shape of the product 13 as it appears in the image 507 may be used as the shape of the product 13. The shape may be a two dimensional shape. That is, while a product will have a three dimensional shape in reality, the product 13 will have a two dimensional shape in the reference image 507. Therefore, shape of the product may relate to a two dimensional shape. Of course, shape may also be a three dimensional shape. For example, where multiple cameras 505 (or 3D camera) are used, a three dimensional shape may be determined for the product 13.

At Step S6, reference data 504 comprising the first data 508 and the second data 509 is generated. The reference data 504 is for use by the inspection system 5 to identify issues during operation of the blister machine. The reference data 504 is data that can be used to compare against subsequent images 505 captured by the camera 501 of the unsealed bottom film 14a during a normal production run of the blister machine in order to identify issues in production. If an image 505 of the unsealed bottom film 14a does not match the reference data 504, it can be determined that there is an issue. For example, with reference to FIGS. 4 to 7, it can be seen that any one of these cases would not match the reference data 504, and so a determination can be made by the inspection system 5 that there is an issue. For example, in the example shown in FIG. 4, the inspection system 5 could determine the location of the pockets 15 using the template derived from the first data 508, and determine that the colour associated with pocket 15a does not match the expected colour of the product 13, given in the second data 509. Additionally, or alternatively, the inspection system 5 could determine that a tablet 13a is located in a region outside of a known location of the pockets 15, and thus determine that there is an issue.

In the case of FIG. 5, the inspection system 5 could determine that pocket 15b does not match the pocket dimensions of the template derived from the first data 508. Additionally, the inspection system 5 could determine that no product is located in pocket 15b based on the second data 509. In the case of FIG. 6, the inspection system 5 could determine that the colour of product 13b does not match the expected colour of the product according to the second data 509. In the case of FIG. 7, the inspection system 5 could determine that the shape, or the dimensions, of product 13c does not match the expected shape of the product according to the second data 509. Any of the above comparisons may of course be based on suitable tolerances set by the user or to default values, depending on the circumstances. For example, the dimensions or shape of a product 13 may appear slightly different in an image depending on how the particular product is sitting in the pocket 15, or where the pocket is relative to the camera.

Generating the reference data 504 may be to associate the first and second data 509 with the reference data 504. That is, the reference data 504 may include both the first and second data 509, and may not necessarily be a separate file, as shown in FIG. 2 (e.g. the first data 508 and the second data 509 may be the reference data 504). Of course, the reference data 504 may comprise the first and second data 508, 509, as well as any other data that can be used by the inspection system 5 to identify issues during operation of the blister machine.

At Step S7, the blister machine is operated using the reference data 504 to produce blister packs. For example, normal production may be started with the inspection system 5 monitoring the unsealed bottom film 14a between the product dispensing system 4 and the sealing system 7 as described above. That is, the camera 501 can take images 505 of the unsealed bottom film 14a and the inspection system 5 can compare the images to the reference data 504 in order to determine an issue. If features in the images 505 (such as dimensions, shape, and/or colour) are compared with the reference data 504 and match (within a permissible tolerance), the unsealed bottom film 14a may be classified as "good" and processed further. If one or more features do not match the reference data 504 (e.g. are outside of the permissible tolerance), appropriate action can be taken. Such action may be to output a notification to a user, output a control signal which causes a specific defective blister pack 12 (or an entire blister row) having an issue to be rejected, and/or output a control signal which halts the blister machine.

Advantageously, the method described herein provides an improved method for configuring an inspection system 5 for determining issues with the production of blister packs 11. In particular, issues can be detected promptly, and corrective action taken before defective blister packs 12 are packaged for onward travel to a patient. Additionally, the speed with which issues can be determined minimises production down-time when issues do occur.

Figure 10:
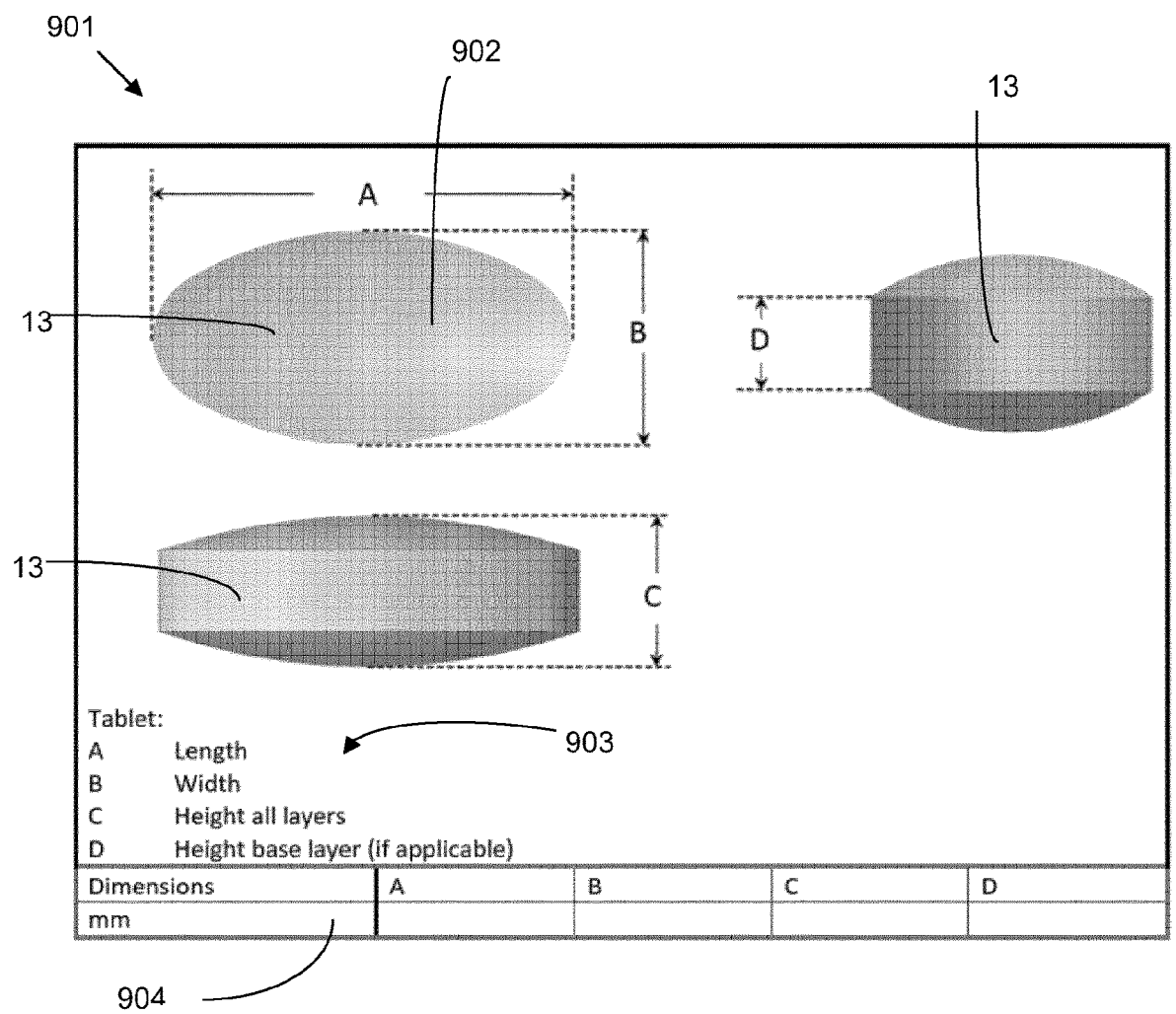
FIG. 10 shows a schematic representation of a second electronic reference associated with a pharmaceutical product.

Optionally, during the configuration process described above, a second electronic reference 901 may be obtained by the inspection system 5. An example of a second electronic reference 901 is shown in FIG. 10. The second electronic reference 901 comprises third data, which relates to the product 13. For example, in the example shown, the second electronic reference 901 comprises geometric data of the product 13. The geometric data is provided in the form of values in millimetres of relative dimensions of the product 13 (length, width, height), the values listed in table 904. The second electronic reference 901 comprises several images 902 of the product 13 (front view, side view, and top view in the example shown) with the relevant dimensions highlighted. The second electronic reference also comprises a legend 903 mapping the highlighted dimensions to a description of the dimension. The second electronic reference 901 may be obtained from a manufacturer of the product 13.

As with the first mentioned electronic reference 801, the second electronic reference 901 may be in any suitable form, and may be presented in any suitable way. In one example, the second electronic reference 901 is a PDF file, but of course other file types such as those mentioned above may also be used. The second electronic reference 901 may be parsed in the same way as the first electronic reference 801 is parsed in step S3 in order to extract the third data (e.g. the geometric data) of the product 13. As described above with respect to the first electronic reference 801, the layout of the second electronic reference 901 may be pre-determined. Alternatively, the inspection system 5 may use, for example, machine learning models to determine what values in the second electronic reference 901 correspond with what dimensions.

The extracted third data of the product 13 may be used to aid identification of the product 13 in step S5. For example, once the second data 509 has been determined using the first data 508 in step S5, the second data 509 may be compared with the third data. For example, if the second data 509 comprises geometric data of the product 13, such as length and width of the product 13, this geometric data may be compared with the geometric data extracted from the second electronic reference 901 to confirm that the identified product is the correct product 13. Note that the third data is not depicted in the memory 503 in FIG. 2, but can of course be stored here.

While the inspection system 5 has been described as being local to the location of the blister machine, it will be appreciated that the components of the inspection system 5 may be distributed. For example, the processor 502 and memory 503 may be located at an external site from the camera 501 and blister machine, e.g. in the cloud. Alternatively, or additionally, the processing carried out by the processor 502 may be distributed between multiple processors, either within the same computer or distributed among different computers.

Figure 11:
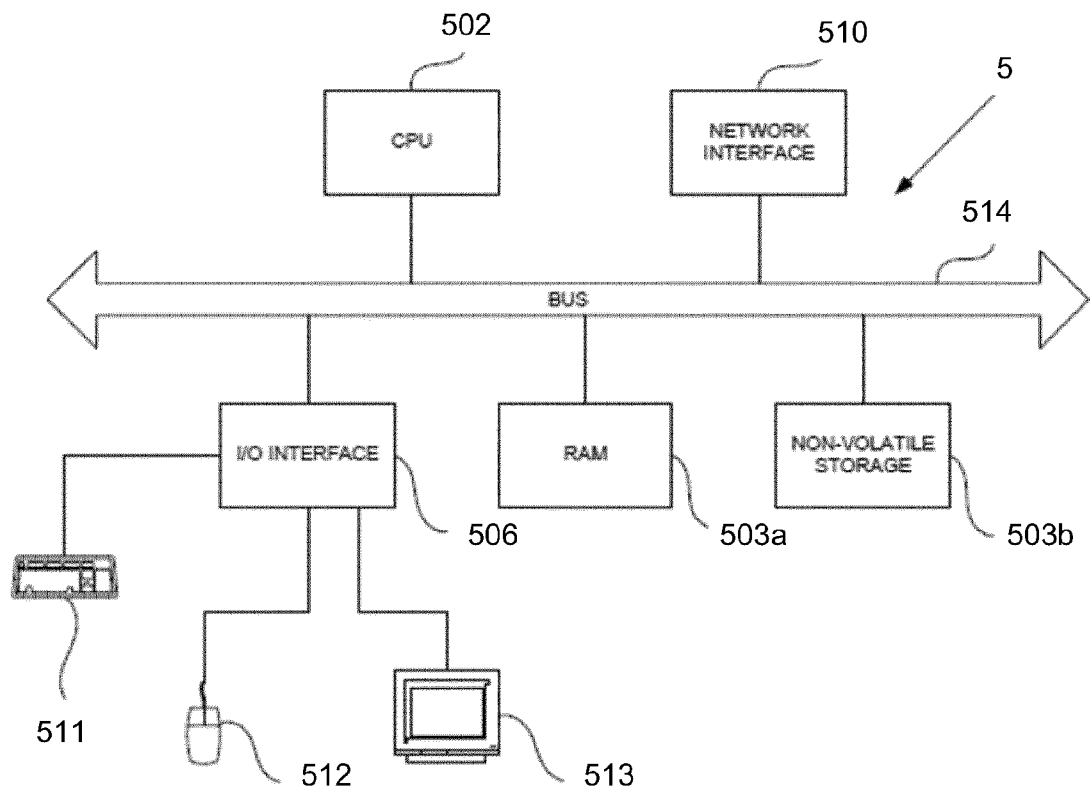
FIG. 11 shows a schematic illustration of an exemplary arrangement of components which may be used to implement the inspection system shown in FIG. 2.

FIG. 11 schematically illustrates an exemplary arrangement of components which may be used to implement the inspection system 5. It can be seen that the inspection system 5 comprises the processor 502 which is configured to read and execute instructions stored in either (or both) a volatile memory 503*a* which takes the form of a random access memory and a non-volatile memory 503*b* (e.g. memory 503 described with respect to FIG. 2 may be any of volatile memory 503*a* or non-volatile memory 503*b*). The memories 503*a*, 503*b* may store instructions for execution by the CPU 502 and data used by those instructions. For example, the instructions may include the instructions for causing the inspection system 5 to carry out the processing described above with reference to FIG. 8.

The inspection system 5 further comprises the I/O interface 506 to which peripheral devices may be connected. For example, a display 513 may be configured so as to display output from the inspection system 5. Input devices may also be connected to the I/O interface 506. Such input devices include a keyboard 511 and a mouse 512 which allow user interaction with the inspection system 5. Of course, it will be appreciated that the input devices and display may be combined in a touch screen arrangement. While not shown, the camera 501 may be coupled to the I/O interface 506, may be hardwired into the inspection system 5, or may be coupled another way, such as via the network interface 510. The network interface 510 allows the inspection system 5 to be connected to appropriate computer networks, such as the Internet or an intranet, and so as to be able to send and receive from and to other computing devices. The processor 502, volatile memory 503*a*, the storage device 503*b*, I/O interface 506, and network interface 510, are connected together by a bus 514. It will be appreciated that the arrangement of components illustrated in FIG. 11 is merely exemplary, and that the inspections system 5 may comprise additional or fewer components than those illustrated in FIG. 11.

While colour has been described, it will be appreciated that colour also covers greyscale. That is, in the case where the camera 501 is a black and white camera, the colour data associated with, for example, the pharmaceutical product 13 may be in terms of grey scale values.

Although specific embodiments of the invention have been described above, it will be appreciated that various modifications can be made to the described embodiments without departing from the scope of the claims. That is, the described embodiments are to be considered in all respects exemplary. In particular, where a particular form has been described for particular processing, it will be appreciated that such processing may be carried out in any suitable form arranged to provide suitable output data.

The invention claimed is:

1. A method for configuring an inspection system of a blister machine for producing at least one first blister pack comprising at least one pharmaceutical product, the method comprising:
   obtaining, by the inspection system, an electronic reference comprising first data, the first data associated with the at least one first blister pack;
   analyzing, by the inspection system, the electronic reference to extract the first data;
   obtaining, by the inspection system, a reference image, the reference image comprising a first image of a portion of a first unsealed bottom film of the at least one first blister pack comprising one or more first pockets in which the at least one pharmaceutical product is located;
   comparing, by the inspection system, the first data with the reference image;
   determining, by the inspection system and based on the comparing, second data associated with the at least one pharmaceutical product; and
   generating, by the inspection system, reference data comprising the first data and the second data, the reference data for use by the inspection system to identify issues during operation of the blister machine.

2. The method as recited in claim 1, wherein the first data associated with the at least one first blister pack comprises geometric data associated with the at least one first blister pack.

3. The method as recited in claim 2, wherein the geometric data is associated with one or more of the at least one first blister pack, the first unsealed bottom film, the one or more first pockets, and a pocket layout.

4. The method as recited in claim 1, wherein the second data comprises color data associated with the at least one pharmaceutical product.

5. The method as recited in claim 1, wherein the second data comprises geometric data of the at least one pharmaceutical product.

6. The method as recited in claim 1, wherein determining the second data associated with the at least one pharmaceutical product comprises:
   determining, by the inspection system, a location in the reference image corresponding to the one or more first pockets;

determining, by the inspection system, one or more first features in the reference image associated with the location corresponding to the one or more first pockets; and determining, by the inspection system, the second data based on the one or more first features.

7. The method as recited in claim 6, wherein determining the one or more first features in the reference image associated with the location corresponding to the one or more first pockets comprises:

determining, by the inspection system, color data associated with the location to determine color data of the at least one pharmaceutical product.

8. The method as recited in claim 7, further comprising:

determining, by the inspection system and based on the color data of the at least one pharmaceutical product, geometric data associated with the at least one pharmaceutical product.

9. The method as recited in claim 6, further comprising determining, by the inspection system, one or more features in the reference image associated with the first unsealed bottom film in a region external to the one or more first pockets.

10. The method as recited in claim 9, wherein determining the one or more features associated with the first unsealed bottom film comprises:

determining, by the inspection system, color data associated with the first unsealed bottom film in the region external to the one or more first pockets; and associating, by the inspection system, the color data associated with the first unsealed bottom film in the region external to the one or more first pockets with the first unsealed bottom film.

11. The method as recited in claim 1, wherein comparing the first data with the reference image comprises:

generating, by the inspection system, a template based on the first data; and comparing, by the inspection system, the template with the reference image.

12. The method as recited in claim 11, wherein comparing the template with the reference image comprises matching, by the inspection system, the template to the portion of the first unsealed bottom film in the reference image.

13. The method as recited in claim 1, further comprising:

obtaining, by the inspection system, a second electronic reference comprising third data associated with the at least one pharmaceutical product;

analyzing, by the inspection system, the second electronic reference to extract the third data; and comparing, by the inspection system, the third data to the second data to identify whether the second data is a match to the third data.

14. The method as recited in claim 1, wherein analyzing the electronic reference comprises extracting text data from the electronic reference.

15. The method as recited in claim 1, wherein the electronic reference includes a PDF file.

16. The method as recited in claim 1, further comprising:

operating the blister machine to produce at least one second blister pack containing the at least one pharmaceutical product, the operating comprising:

forming, by a pocket forming apparatus, one or more second pockets in a second unsealed bottom film;

inserting, by a product dispensing apparatus, a pharmaceutical product in each pocket of the one or second more second pockets;

obtaining, by the inspection system, an image of the second unsealed bottom film;

comparing, by the inspection system, the image of the second unsealed bottom film to the reference data; and determining, by the inspection system and based on the comparing, an issue with production of the at least one second blister pack.

17. The method as recited in claim 16, further comprising:

determining, by the inspection system, corrective action to be performed based on the issue; and executing, by the inspection system, the corrective action.

18. A method for configuring an inspection system of a blister machine for producing at least one blister pack comprising at least one pharmaceutical product, the method comprising:

obtaining, by the inspection system, an electronic reference comprising geometric data associated with an unsealed bottom film of the at least one blister pack;

analyzing, by the inspection system, the electronic reference to extract the geometric data associated with the unsealed bottom film;

obtaining, by the inspection system, a reference image, the reference image comprising an image of a portion of the unsealed bottom film of the at least one blister pack comprising one or more pockets in which the at least one pharmaceutical product is located;

comparing, by the inspection system, the geometric data associated with the unsealed bottom film with the image of the portion of the unsealed bottom film in the reference image;

locating, by the inspection system and based on the comparing, the one or more pockets in the unsealed bottom film;

determining, by the inspection system, color data associated with the at least one pharmaceutical product based on the location of the one or more pockets; and determining, by the inspection system and based on the color data associated with the at least one pharmaceutical product, geometric data associated with the at least one pharmaceutical product.

19. The method as recited in claim 18, further comprising: generating, by the inspection system, reference data, the reference data comprising the geometric data associated with the unsealed bottom film and one or more of the geometric data associated with the at least one pharmaceutical product and the color data associated with the at least one pharmaceutical product, wherein the reference data is for use by the inspection system to identify issues during operation of the blister machine.

20. An inspection system of a blister machine, the inspection system comprising:

one or more processors; and a memory, the memory comprising instructions that are executable by the one or more processors, the instructions comprising:

instructions to configure the inspection system of the blister machine to produce at least one blister pack comprising at least one pharmaceutical product, wherein the instructions to configure the inspection system comprise:

instructions to obtain an electronic reference comprising first data, the first data associated with the at least one blister pack;

instructions to analyze the electronic reference to extract the first data;

instructions to obtain a reference image, the reference image comprising an image of a portion of an unsealed bottom film of the at least one blister pack comprising one or more pockets in which the at least one pharmaceutical product is located;

instructions to compare the first data with the reference image;

instructions to determine based on the comparison, second data associated with the at least one pharmaceutical product; and instructions to generate reference data comprising the first data and the second data, the reference data for use by the inspection system to identify issues during operation of the blister machine.

* * * * *